(12) United States Patent
Morris et al.

(10) Patent No.: US 6,654,124 B2
(45) Date of Patent: Nov. 25, 2003

(54) SIGNAL MODULATION COMPENSATION FOR WAVELENGTH METER

(75) Inventors: Michael B. North Morris, Santa Rosa, CA (US); David M. Braun, Santa Rosa, CA (US); Gregory S. Hill, Santa Rosa, CA (US)

(73) Assignee: Agilent Technologies, Inc., Palo Alto, CA (US)

( * ) Notice: Subject to any disclaimer, the term of this patent is extended or adjusted under 35 U.S.C. 154(b) by 77 days.

(21) Appl. No.: 09/962,042

(22) Filed: Sep. 21, 2001

(65) Prior Publication Data

US 2003/0058452 A1 Mar. 27, 2003

(51) Int. Cl.[7] ................................................. G01B 9/02
(52) U.S. Cl. ...................................................... 356/451
(58) Field of Search ................................ 356/450, 451, 356/452, 484; 250/339.07, 339.08; 359/370, 371

(56) References Cited

U.S. PATENT DOCUMENTS 4,444,501 A * 4/1984 Schwiesow ................ 356/452
6,043,883 A * 3/2000 Leckel et al. ............... 356/454

OTHER PUBLICATIONS

Dennis Derickson, *Fiber Optic Test and Measurement*, Prentice Hall, Inc., 1998, pp. 133–141.

Agilent 86120C Multi–Wavelength Meter Technical Specifications, Agilent Technologies, Mar. 2000, 5968–1045E.

\* cited by examiner

*Primary Examiner*—Samuel A. Turner
*Assistant Examiner*—Michael A. Lyons

(57) ABSTRACT

An interferometer system is used to detect a wavelength of an unknown signal. The interferometer system includes a fringe pattern detection system and a power detecting system. The fringe pattern detection system measures an interference fringe pattern of the unknown signal. The power detecting system measures relative power of the unknown signal before the unknown signal enters the fringe pattern detection system. The relative power of the unknown signal is used to compensate for modulation within the unknown signal.

20 Claims, 1 Drawing Sheet

SIGNAL MODULATION COMPENSATION FOR WAVELENGTH METER

BACKGROUND

The present invention concerns signal test and measurement and pertains particularly to signal modulation compensation for a wavelength meter.

In a Michelson interferometer system, light from a fiber optic input is collimated and directed to the input of the interferometer. The input signal is split into two paths with a beam splitter. Both beams are then reflected by mirrors that bounce the light back toward the beam splitter. Part of the light reflected from the mirrors goes back toward the input beam. The other portion of the light is incident on a photodetector. Since there is no loss assumed in the interferometer, all of the light is directed to either the photodetector or the input beam.

One of the mirrors of the interferometer is stationary and one is movable. The movable mirror is movable to vary the length the beam travels before and after incidence with the movable mirror. As the mirror is moved, the amount of light reaching the photodetector will oscillate up and down because of constructive and destructive interference effects between the two paths of the interferometer. Through the analysis of these interference patterns, the wavelength of light can be calculated.

The beams of light can be analyzed in terms of light interfering as the path length in the interferometer changes. This is referred to as the fringe-counting description of wavelength meter operation. Alternately, if the movable mirror is moved at a constant rate, the frequency of the light in the beam is Doppler-frequency shifted. The Doppler detector then mixes the light from the moveable mirror and the stationary mirror. The beat frequency between these two signals can be used to calculate the unknown frequency of the input signal. See Dennis Derickson, *Fiber Optic Test and Measurement*, Prentice Hall, Inc., 1998, pp. 133–141.

A Michelson interferometer based wavelength meter measures the wavelength of an unknown signal by comparing the fringe pattern produced by the unknown signal with that of the reference (known) signal. As one arm of the Michelson interferometer is translated (i.e., the mirror is moved) the interference pattern at the photodetector oscillates between high and low irradiance. Comparing the number of fringes produced by the unknown signal with the number produced by the known signal results in a highly accurate estimate of the unknown wavelength.

Unfortunately, if the unknown signal is amplitude modulated it becomes difficult to accurately count the number of unknown fringes. If Fourier transform techniques are used to determine the power spectrum of the signal the modulation produces false peaks equally spaced on either side of the true frequency called sidebands.

SUMMARY OF THE INVENTION

In accordance with the preferred embodiment of the present invention, an interferometer system is used to detect a wavelength of an unknown signal. The interferometer system includes a fringe pattern detection system and a power detecting system. The fringe pattern detection system measures an interference fringe pattern of the unknown signal. The power detecting system measures relative power of the unknown signal before the unknown signal enters the fringe pattern detection system. The relative power of the unknown signal is used to compensate for modulation within the unknown signal.

DESCRIPTION OF THE PREFERRED EMBODIMENT

Figure 1:
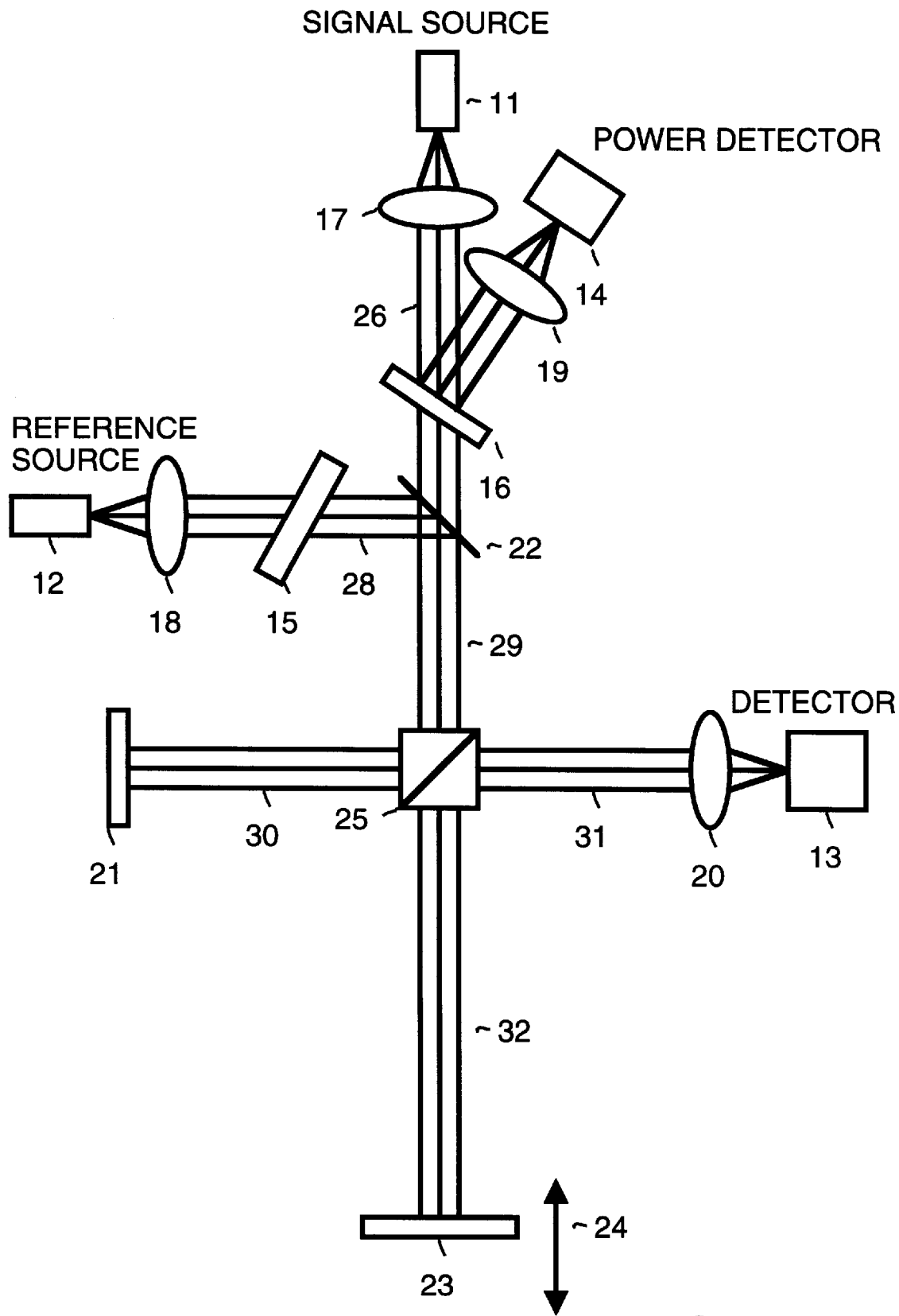
FIG. 1 is a simplified block diagram of a Michelson interferometer based wavelength meter in accordance with a preferred embodiment of the present invention.

FIG. 1 is a simplified block diagram of a Michelson interferometer based wavelength meter. A signal source 11 is the source of an "unknown" signal with an unknown wavelength. For example, signal source 11 is an optical fiber carrying a light signal. A collimating lens 17 collimates the light from signal source 11 to produce a beam 26. For example, collimating lens 17 is a 7.5 millimeter (mm) focal length lens.

A reference source 12 is the source of a reference signal with a known wavelength. A collimating lens 18 collimates the light from reference source 12. For example, collimating lens 18 is a 6.0 mm focal length lens. A resulting reference beam 28 is in a different plane than beam 26. For example, beam 26 is in a higher parallel plane than reference beam 28. A fold mirror 22 is in the same plane as reference beam 28 and reflects beam 28 to run in parallel with beam 26 along a beam path 29. Beam 26 is not in the same plane as fold mirror 22 and so is unaffected by (i.e., passes over) fold mirror 22.

A beam splitter 25 splits beam 26 and reference beam 28 so that a portion of each beam runs along a beam path 30, is reflected by a corner cube mirror 21 and returns to beam splitter 25 along beam path 30. The remaining portion of each beam runs along a beam path 32, is reflected by a corner cube mirror 23 and returns to beam splitter 25 along beam path 32. The beams switch planes at the corner cube mirrors.

After returning to beam splitter 25, a portion of each beam travels back along beam path 29 and a portion of each beam is directed to beam path 31 through imaging lenses 20 to detectors 13. In the preferred embodiment, lenses 20 are two lenses, one for each beam, and detectors 13 are two detectors, one for each beam. For example, each of imaging lenses 20 is a 25.4 mm focal length lens.

A portion of the beam in the lower plane is reflected by fold mirror 22 towards collimating lens 18. This beam in the lower plane originated from signal source 11. A high pass filter 15 blocks the reflected beam from reaching collimating lens 18.

A portion of the beam in the higher parallel plane passes over fold mirror 22 and continues towards collimating lens 17. This beam in the higher parallel plane originated from reference source 12. A low pass filter 16 blocks this beam from reaching collimating lens 17.

The beams of light detected by detectors 13 can be analyzed in terms of light interfering as the path length in the interferometer changes. As corner cube mirror 23 is translated (moved), as represented by an arrow 24, the interference patterns at detectors 13 oscillate between high and low irradiance. Comparing the number of fringes produced by the unknown signal with the number produced by the reference signal results in a highly accurate estimate of the wavelength of the unknown signal.

As discussed above, if the unknown signal is amplitude modulated it becomes difficult to accurately count the number of unknown fringes. If Fourier transform techniques are used to determine the power spectrum of the signal the modulation produces false peaks equally spaced on either side of the true frequency called sidebands.

In the preferred embodiments of the present invention, additional entities are added to make fringe counting more accurate and eliminate spurious signals in the Fourier transform of the data array. Specifically, a detector 14 and an imaging lens 19 are added to the Michelson interferometer based wavelength meter. For example, imaging lens 19 is a 25.4 mm focal length lens. Detector 14 detects the input power of beam 26 before beam 26 reaches beam splitter 25. The power is detected based on reflections from beam 26 resulting from beam 26 passing through low pass filter 16. It is not required that power is split away by low pass filter 16. Power can be split away by a separate item added specifically to perform the splitting.

The measured input power is used to compensate for the modulation within the signal from signal source 11. This is done by dividing the fringe pattern for the unknown signal, detected by detector 13, by the relative power of the unknown signal, as measured by detector 14.

The power (P) of the fringe pattern at detector 13 is represented by Equation 1 below:

$$P(x, t) = P_1 A(t) \left( \frac{1 + \gamma \cos\left[\frac{4\pi x}{\lambda_{unknown}}\right]}{2} \right) \quad \text{Equation 1}$$

In Equation 1 above, A(t) represents the amplitude modulation of the unknown signal, $\gamma$ is a fringe contrast constant, x represents a location of corner cube mirror 23, t represents time, $P_1$ is a constant that represents the maximum power that would arrive at detector 13 if the signal were unmodulated and for $\gamma=1$, and $\lambda_{unknown}$ is the wavelength of the unknown signal. Detector 13 measures P(x,t) and detector 14 measures $P_2 A(t)$. This allows A(t) to be removed by dividing P(x,t) measured at detector 13 by $P_2 A(t)$ as measured at detector 14. The result for P' is given in Equation 2 below:

$$P'(x) = \frac{P(x, t)}{P_2 A(t)} = \left( \frac{1 + \gamma \cos\left[\frac{4\pi x}{\lambda_{unknown}}\right]}{2} \right) \frac{P_1}{P_2} \quad \text{Equation 2}$$

$P_2$ is a constant that represents the maximum power that arrives at detector 14. By using the value of $P_2 A(t)$ detected at detector 14 to remove the modulation from the signal detected at detector 13, this increases the accuracy of fringe counting and helps to eliminate spurious signals in the Fourier transform of the data array.

The foregoing discussion discloses and describes merely exemplary methods and embodiments of the present invention. As will be understood by those familiar with the art, the invention may be embodied in other specific forms without departing from the spirit or essential characteristics thereof. Accordingly, the disclosure of the present invention is intended to be illustrative, but not limiting, of the scope of the invention, which is set forth in the following claims.

We claim:

1. An interferometer system used to detect a wavelength of an unknown signal, the interferometer system comprising:
   a fringe pattern detection means for measuring an interference fringe pattern of the unknown signal; and,
   a power detecting means for measuring relative power of the unknown signal before the unknown signal enters the fringe pattern detection means, whereby the relative power of the unknown signal is used to compensate for modulation within the unknown signal.

2. An interferometer system as in claim 1 wherein the fringe pattern detection means comprises:
   a beam splitter which splits the unknown signal into a first portion and a second portion;
   a first mirror that reflects the first portion of the unknown signal back to the beam splitter;
   a second mirror that reflects the second portion of the unknown signal back to the beam splitter; and
   a photodetector that detects an interference fringe pattern resulting from a combination of the first portion of the unknown signal and the second portion of the unknown signal, the first portion of the unknown signal and the second portion of the unknown signal being combined by the beam splitter.

3. An interferometer system as in claim 1 wherein the fringe pattern detection means comprises:
   a beam splitter which splits the unknown signal into a first portion and a second portion;
   a first mirror that reflects the first portion of the unknown signal back to the beam splitter;
   a second mirror that reflects the second portion of the unknown signal back to the beam splitter, the second mirror being movable to vary a distance between the second mirror and the beam splitter; and
   a photodetector that detects an interference fringe pattern resulting from a combination of the first portion of the unknown signal and the second portion of the unknown signal, the first portion of the unknown signal and the second portion of the unknown signal being combined by the beam splitter.

4. An interferometer system as in claim 1 wherein the fringe pattern detection means comprises:
   a beam splitter which splits the unknown signal into a first portion and a second portion;
   a first mirror that reflects the first portion of the unknown signal back to the beam splitter;
   a second mirror that reflects the second portion of the unknown signal back to the beam splitter;
   a photodetector that detects an interference fringe pattern resulting from a combination of the first portion of the unknown signal and the second portion of the unknown signal, the first portion of the unknown signal and the second portion of the unknown signal being combined by the beam splitter; and,
   a reference signal that runs in parallel with the unknown signal through the beam splitter.

5. An interferometer system as in claim 1:
   wherein the fringe pattern detection means comprises:
      a beam splitter which splits the unknown signal into a first portion and a second portion,
      a first mirror that reflects the first portion of the unknown signal back to the beam splitter,
      a second mirror that reflects the second portion of the unknown signal back to the beam splitter, the second mirror being movable to vary a distance between the second mirror and the beam splitter, and
      a photodetector that detects an interference fringe pattern resulting from a combination of the first portion of the unknown signal and the second portion of the unknown signal, the first portion of the unknown signal and the second portion of the unknown signal being combined by the beam splitter;

wherein the interferometer system additionally comprises a filter through which the unknown signal passes before reaching the beam splitter; and, wherein the power detecting means includes a power detector that is used to determine relative power of the unknown signal based on detected power of a portion of the unknown signal reflected by the filter.

6. An interferometer system as in claim 1:

wherein the interferometer system additionally comprises a filter through which the unknown signal passes before reaching the fringe pattern detection means; and, wherein the power detecting means includes a power detector that is used to determine relative power of the unknown signal based on detected power of a portion of the unknown signal reflected by the filter.

7. An interferometer system as in claim 1:

wherein the interferometer system additionally comprises a filter through which the unknown signal passes before reaching the fringe pattern detection means; and, wherein the power detecting means includes a power detector that is used to determine relative power of the unknown signal based on detected power of a portion of the unknown signal reflected by the filter, the power detector comprising:
an imaging lens, and
a photodetector.

8. A method used to detect a wavelength of an unknown signal, the method comprising the following steps:

(a) measuring relative power of the unknown signal;

(b) measuring an interference fringe pattern of the unknown signal; and, (c) using the measured relative power of the unknown signal to compensate for modulation within the unknown signal.

9. A method as in claim 8 wherein step (b) includes the following substeps:

(b.1) splitting, by a beam splitter, the unknown signal into a first portion and a second portion;

(b.2) reflecting the first portion of the unknown signal back to the beam splitter;

(b.3) reflecting the second portion of the unknown signal back to the beam splitter; and, (b.4) detecting an interference fringe pattern resulting from a combination of the first portion of the unknown signal and the second portion of the unknown signal, the first portion of the unknown signal and the second portion of the unknown signal being combined by the beam splitter.

10. A method as in claim 8 wherein step (b) includes the following substeps:

(b.1) splitting, by a beam splitter, the unknown signal into a first portion and a second portion;

(b.2) reflecting, by a first mirror, the first portion of the unknown signal back to the beam splitter;

(b.3) reflecting, by a second mirror, the second portion of the unknown signal back to the beam splitter, including the following substep:
moving the second mirror to vary a distance between the second mirror and the beam splitter; and, (b.4) detecting an interference fringe pattern resulting from a combination of the first portion of the unknown signal and the second portion of the unknown signal, the first portion of the unknown signal and the second portion of the unknown signal being combined by the beam splitter.

11. A method as in claim 8 wherein step (b) includes the following substeps:

(b.1) splitting, by a beam splitter, the unknown signal into a first portion and a second portion;

(b.2) reflecting the first portion of the unknown signal back to the beam splitter;

(b.3) reflecting the second portion of the unknown signal back to the beam splitter;

(b.4) detecting an interference fringe pattern resulting from a combination of the first portion of the unknown signal and the second portion of the unknown signal, the first portion of the unknown signal and the second portion of the unknown signal being combined by the beam splitter; and (b.5) providing a reference signal that runs in parallel with the unknown signal through the beam splitter.

12. A method as in claim 8:

wherein step (b) includes the following substeps:
(b.1) splitting, by a beam splitter, the unknown signal into a first portion and a second portion,
(b.2) reflecting, by a first mirror, the first portion of the unknown signal back to the beam splitter,
(b.3) reflecting, by a second mirror, the second portion of the unknown signal back to the beam splitter, including the following substep:
moving the second mirror to vary a distance between the second mirror and the beam splitter, and
(b.4) detecting an interference fringe pattern resulting from a combination of the first portion of the unknown signal and the second portion of the unknown signal, the first portion of the unknown signal and the second portion of the unknown signal being combined by the beam splitter; and, wherein step (a) includes the following substeps:
(a.1) passing the unknown signal through a filter, and
(a.2) detecting a portion of the unknown signal reflected by the filter in order to determine relative power of the unknown signal.

13. A method as in claim 8 wherein step (a) includes the following substeps:

(a.1) passing the unknown signal through a filter; and, (a.2) detecting a portion of the unknown signal reflected by the filter in order to determine relative power of the unknown signal.

14. A system used to detect a wavelength of an unknown signal, the system comprising:

a power detector system that measures relative power of the unknown signal; and, a fringe pattern detector system that measures an interference fringe pattern of the unknown signal;

wherein the measured relative power of the unknown signal is used to compensate for modulation within the unknown signal.

15. A system as in claim 14 wherein the fringe pattern detector system comprises:

a beam splitter used to split the unknown signal into a first portion and a second portion;

a first mirror used to reflect the first portion of the unknown signal back to the beam splitter;

a second mirror used to reflect the second portion of the unknown signal back to the beam splitter; and an optical detector that detects an interference fringe pattern resulting from a combination of the first portion of the unknown signal and the second portion of the unknown signal, the first portion of the unknown signal and the second portion of the unknown signal being combined by the beam splitter.

16. A system as in claim 14 wherein the fringe pattern detector system comprises:

a beam splitter used to split the unknown signal into a first portion and a second portion;

a first mirror used to reflect the first portion of the unknown signal back to the beam splitter;

a second mirror used to reflect the second portion of the unknown signal back to the beam splitter, the second mirror being movable to vary a distance between the second mirror and the beam splitter; and, an optical detector that detects an interference fringe pattern resulting from a combination of the first portion of the unknown signal and the second portion of the unknown signal, the first portion of the unknown signal and the second portion of the unknown signal being combined by the beam splitter.

17. A system as in claim 14 wherein the fringe pattern detector system comprises:

a beam splitter used to split the unknown signal into a first portion and a second portion;

a first mirror used to reflect the first portion of the unknown signal back to the beam splitter;

a second mirror used to reflect the second portion of the unknown signal back to the beam splitter;

an optical detector that detects an interference fringe pattern resulting from a combination of the first portion of the unknown signal and the second portion of the unknown signal, the first portion of the unknown signal and the second portion of the unknown signal being combined by the beam splitter; and, a reference signal that runs in parallel with the unknown signal through the beam splitter.

18. A system as in claim 14:

wherein the fringe pattern detector system comprises:

a beam splitter used to split the unknown signal into a first portion and a second portion, a first mirror used to reflect the first portion of the unknown signal back to the beam splitter, a second mirror used to reflect the second portion of the unknown signal back to the beam splitter, and an optical detector that detects an interference fringe pattern resulting from a combination of the first portion of the unknown signal and the second portion of the unknown signal, the first portion of the unknown signal and the second portion of the unknown signal being combined by the beam splitter;

wherein the system additionally comprises a filter through which the unknown signal passes before reaching the fringe pattern detector system; and, wherein the power detector system detects a portion of the unknown signal reflected by the filter in order to determine relative power of the unknown signal.

19. A system as in claim 14:

wherein the system additionally comprises a filter through which the unknown signal passes before reaching the fringe pattern detector system; and, wherein the power detector system detects a portion of the unknown signal reflected by the filter in order to determine relative power of the unknown signal.

20. A system as in claim 14:

wherein the system additionally comprises a filter through which the unknown signal passes before reaching the fringe pattern detector system; and, wherein the power detector system includes a power detector that is used to determine relative power of the unknown signal based on detected power of a portion of the unknown signal reflected by the filter, the power detector comprising:

an imaging lens, and a photodetector.

* * * * *